(12) United States Patent
Andersson et al.

(10) Patent No.: US 8,906,126 B2
(45) Date of Patent: Dec. 9, 2014

(54) FILTER SYSTEM

(75) Inventors: Rune Andersson, Vaxjo (SE); Anders Hjelmberg, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 201 days.

(21) Appl. No.: 13/578,859

(22) PCT Filed: Jan. 25, 2011

(86) PCT No.: PCT/IB2011/000114
§ 371 (c)(1),
(2), (4) Date: Nov. 14, 2012

(87) PCT Pub. No.: WO2011/101715
PCT Pub. Date: Aug. 25, 2011

(65) Prior Publication Data
US 2013/0167721 A1 Jul. 4, 2013

(30) Foreign Application Priority Data
Feb. 18, 2010 (EP) .................................. 10153962

(51) Int. Cl.
*B01D 46/42* (2006.01)
*B01D 46/02* (2006.01)
*B01D 46/00* (2006.01)
*B01D 46/44* (2006.01)

(52) U.S. Cl.
CPC ............ *B01D 46/0047* (2013.01); *B01D 46/02* (2013.01); *B01D 46/44* (2013.01); *B01D 46/4272* (2013.01)
USPC ........................................... 55/417; 55/341.1

(58) Field of Classification Search
CPC .............................. B01D 46/0047; B01D 46/02
USPC .................................. 95/273; 55/417, 341.1
See application file for complete search history.

(56) References Cited

U.S. PATENT DOCUMENTS 1,259,008 A 3/1918 Holt
2,477,623 A 8/1949 Kling
(Continued)

FOREIGN PATENT DOCUMENTS

JP 54-132068 9/1979
JP S62-74461 4/1987
(Continued)

OTHER PUBLICATIONS

Search Report established by the ROC (Taiwan) Patent Office dated Apr. 30, 2013.

(Continued)

*Primary Examiner* — Duane Smith
*Assistant Examiner* — Stephen Hobson

(57) ABSTRACT

The present disclosure relates to a fabric filter system, which may be used for removing particulate matter from a gas, such as a combustion process gas. The fabric filter system includes fabric filters (3) in a filter module. From the fabric filters (3), gas flows through a filter plenary space (5) and into an outlet duct (7). A flow control device (17) controls the amount of gas flowing into and through the outlet duct (7). The flow control device (17) comprises a guillotine-type damper (17). The guillotine-type damper (17) provides reliable and efficient control of the gas flow from the filter plenary space (5) into the outlet duct (7). A collar (21), fluidly connecting the filter plenary space with the outlet duct, improves the gas flow into the outlet duct (7).

6 Claims, 3 Drawing Sheets

(56) References Cited

U.S. PATENT DOCUMENTS

| | | | |
|---|---|---|---|
| 4,022,595 A | | 5/1977 | Noland |
| 4,336,035 A | | 6/1982 | Evenstad et al. |
| 4,368,676 A | * | 1/1983 | Henriksen et al. ..... 110/101 CD |
| 4,399,742 A | * | 8/1983 | Dobias ........................... 454/55 |
| 4,700,615 A | * | 10/1987 | Napadow ........................ 454/54 |
| 4,895,181 A | | 1/1990 | McKavanagh |
| 5,240,485 A | * | 8/1993 | Haerle et al. .................... 55/309 |
| 5,741,178 A | * | 4/1998 | Telchuk ........................... 454/54 |
| 7,297,173 B2 | | 11/2007 | Renwart et al. |
| 8,268,031 B2 | * | 9/2012 | Andersson et al. ............. 55/415 |
| 2003/0041729 A1 | * | 3/2003 | Finigan ............................ 95/26 |
| 2008/0216457 A1 | | 9/2008 | Morse et al. |
| 2010/0058722 A1 | * | 3/2010 | Andersson et al. ............. 55/415 |

FOREIGN PATENT DOCUMENTS

| | | |
|---|---|---|
| JP | 63-115423 | 7/1988 |
| JP | H1-148382 | 6/1989 |
| JP | H10-185263 | 7/1998 |
| JP | H10-281510 | 10/1998 |
| JP | 2002-282635 | 10/2002 |
| JP | 2009521307 | 6/2009 |
| JP | 2012-501846 | 1/2012 |

OTHER PUBLICATIONS

International Search Report and Written Opinion, International Application No. PCT/IB2011/000114, International Searching Authority, Dated May 6, 2011.

European Search Report, European Patent Application No. 10153962, Dated Apr. 19, 2010.

European Written Opinion, European Patent Application No. 10153962, Dated Apr. 19, 2010.

Notification of Reasons for Refusal, Japanese Appln. No. 2012-553410, dated Jun. 2, 2014.

* cited by examiner

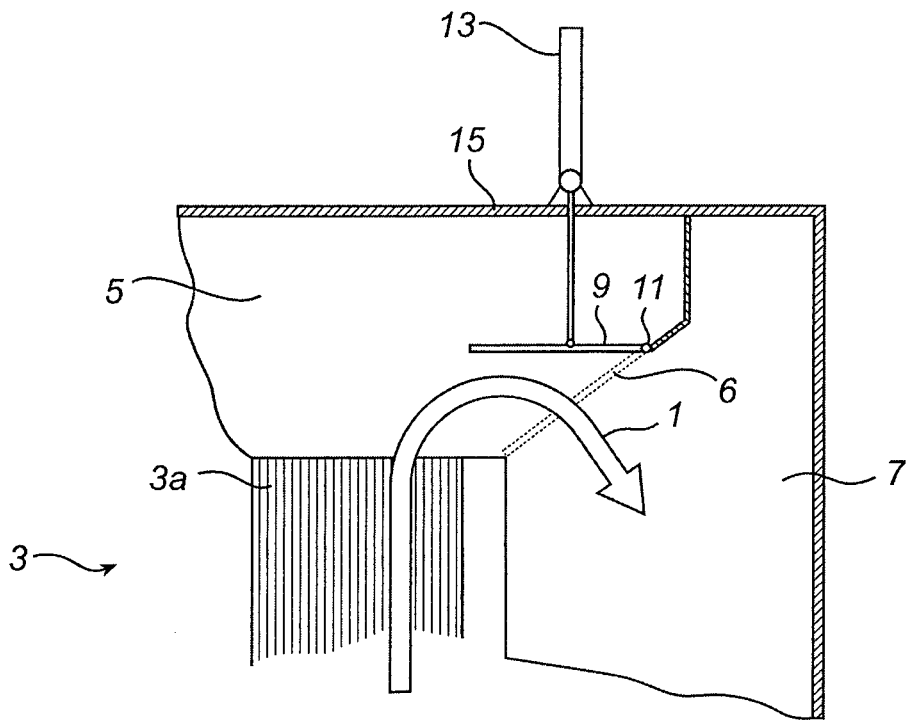
(Prior art) *Fig. 1*
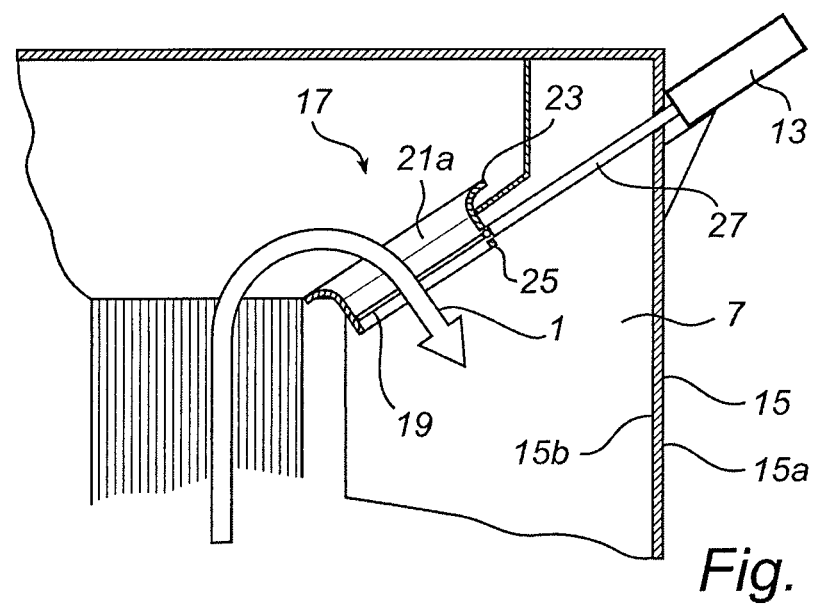
*Fig. 2*

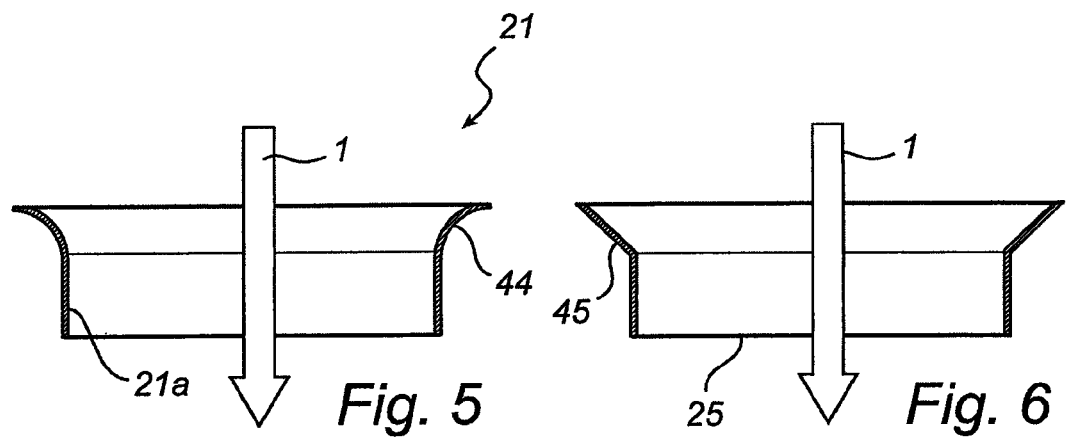
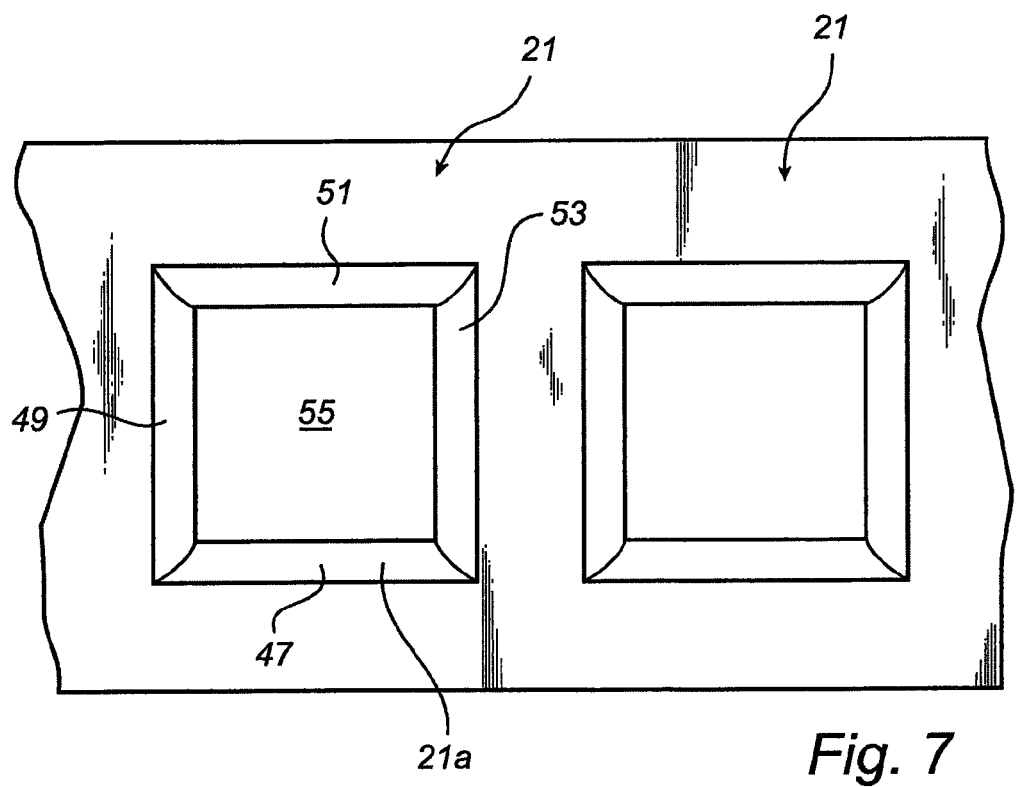

FILTER SYSTEM

FIELD OF THE INVENTION

The present disclosure relates to a fabric filter system, for removing particulate matter from a gas. More specifically, the subject fabric filter system comprises a fabric filter, a filter plenary space, an outlet duct and a flow control device, through which gas may flow from the fabric filter and sequentially through the filter plenary space and the outlet duct, with the flow control device controlling the amount of gas flowing through the outlet duct.

BACKGROUND ART

A general example of a fabric filter system is disclosed in U.S. Pat. No. 4,336,035. Such a fabric filter system typically comprises a plurality of filter bags, which separate particulate matter from a gas flow. A typical application of such a fabric filter system is to clean flue gases from a coal combustion process.

In some cases, it is desired to substantially stop gas from flowing through at least a portion of the fabric filter system. One such case, for example, is to allow service staff to enter the interior of one filter module of the fabric filter system, while filtering continues in other, parallel filter modules within the same fabric filter system.

Termination of gas flow through at least a portion of a fabric filter system may be provided by means of a flow control device. The flow control device, such as a flap damper, may be devised as a hinged door pivotably moveable between two positions. One position whereby the hinged door does not cover the filter module opening to the outlet duct, i.e., open position, and one position whereby the hinged door does cover the filter module opening to the outlet duct, i.e., closed position.

One problem associated with such a filter modules is that the hinged door may be difficult to operate. In particular, this is a problem if the filter module opening is large thereby requiring a large hinged door to cover the same. In such a case, considerable force is needed to move the hinged door from one position to the other.

SUMMARY

One object of the present disclosure is therefore to provide a fabric filter system where the system's gas flow may be controlled more easily.

This object is achieved by means of a fabric filter system, for removing particulate matter from a gas stream comprising at least one filter module equipped with a fabric filter, a filter plenary space, an outlet duct, and a control device all fluidly connected to allow gas flow from the fabric filter sequentially through the filter plenary space and outlet duct. The control device is located between the filter plenary space and the outlet duct. The control device is used to control the amount of gas allowed to flow into and through the outlet duct. The subject control device is a guillotine-type damper.

The subject guillotine-type damper is more efficient as compared to prior art hinged doors. Such is particularly true when the opening to be controlled is relatively large. Suitable relatively large hinged doors may be quite heavy and relatively cumbersome to position. Also, such is true when pressure differentiations exist within the system requiring not only the weight of the door to be overcome for positioning, but also forces thereon as a result of the pressure differentiations. In comparison, the subject guillotine-type damper may be positioned and repositioned with relative ease even when relatively large in size by sliding the same. Also, the amount of force needed to achieve the sliding motion of the damper is fairly independent of pressure differentiations within the system, e.g., a pressure drop at the damper.

The subject fabric filter system may further include a collar comprising a collar body, one open wide end of a particular circumference and one open narrow end of a particular circumference preferably less than that of the open wide end. The collar may be used to fluidly connect the outlet duct with the filter plenary space of the filter module. In such a case, the open wide end is attached to or positioned within the filter module so as to be fluidly connected with the filter plenary space. The open narrow end of the collar is attached to or positioned within the outlet duct so as to be fluidly connected with the outlet duct. The collar is useful to improve gas flow between the plenary space and the outlet duct. Gas flow is improved in that the larger circumference of the open wide end of the tapered collar may facilitate gas channeling from a larger area within the plenary space through collar body to a smaller area at the open narrow end of the collar prior to flow into the outlet duct. By positioning the control device at the open narrow end of the collar, a smaller guillotine-type damper may be used to control gas flow. Accordingly, the collar body may extend longitudinally between the open wide end to the open narrow end as a smoothly curved surface, as a funnel-shape, as shape variations therebetween or the like.

As an alternative embodiment, the open wide end, open narrow end and collar body may each have a rectangular cross-section, a square cross-section or like geometric cross-section taken perpendicular to the longitudinal axis of the collar body at open wide end, open narrow end and midway between open wide end and open narrow end, respectively. Thus, the guillotine-type damper is of any geometric shape compatible to control gas flow at open narrow end. As an alternative embodiment, the guillotine-type damper is of a geometric shape compatible to control gas flow at open wide end and is positioned at open wide end to control gas flow through open wide end. As an alternative embodiment, open wide end, open narrow end and collar body are each of the same geometric cross-section, differing geometric cross-sections, or a combination thereof.

The subject guillotine-type damper may be controllable for positioning in an open position and in a closed position. Further, the subject damper may be controllable for positioning in at least one intermediate position between the open position and the closed position. Such positioning of the damper allows the damper to be used not only to shut the gas flow off, but also to increase or decrease gas flow in order to balance the gas flow between parallel filter modules.

The disclosure further includes a method for controlling a fabric filter system, for removing particulate matter from a gas, wherein the fabric filter system comprises a fabric filter, a filter plenary space, receiving gas from the fabric filter, an outlet duct, fluidly connected to the filter plenary space, and a flow control device for controlling the amount of gas passing from the plenary space into the outlet duct via an opening. The method involves providing the flow control device in the form of a guillotine-type damper having a blade, controlling said amount of gas passing from the plenary space into the outlet duct by moving said blade in or out of said opening.

BRIEF DESCRIPTION OF THE DRAWINGS

FIG. 1 shows an outlet part of a fabric filter system according to prior art.

FIG. 2 shows a corresponding outlet part of a fabric filter system according to the present disclosure.

FIG. 5 shows a first duct opening collar design.

FIG. 6 shows a second duct opening collar design.

FIG. 7 shows a front view of two openings to a duct, being arranged side by side.

DETAILED DESCRIPTION

Figure 3:
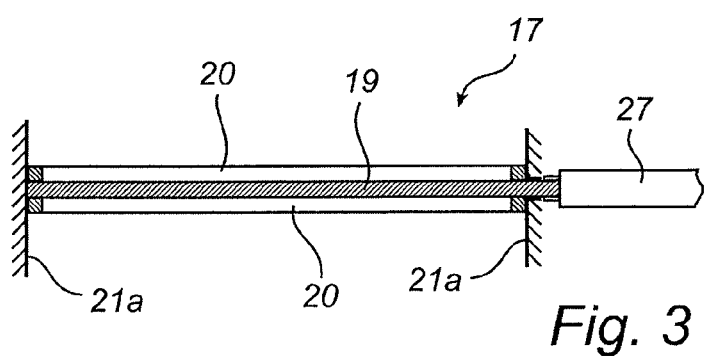
FIG. 3 shows a guillotine type damper in a closed position.

FIG. 1 illustrates a portion of a filter module including an outlet according to prior art. Filter modules in general are well known to the skilled person in the art, and therefore not described herein in detail.

In general, particulate matter is removed from a gas stream 1 by means of a fabric filter 3a which may comprise a plurality of fabric bags or hoses. In a typical application, the filter module 3 may be used to remove particles from a flue gas stream exiting a combustion chamber in a fossil fuel fired boiler. When exiting the fabric filters 3a of filter module 3, the gas passes through a filter plenary space 5 above the fabric filters 3a. Plenary space 5 is common to the plurality of filter bags or hoses. The gas in plenary space 5 then flows through opening 6 in filter module 3 to an outlet duct 7, which may be positioned laterally with respect to fabric filters 3a and plenary space 5. A plurality of openings 6 may be provided in filter module 3. The filter module 3 comprises a flow control device in the form of a door 9 for each opening 6. The door 9 is pivotably attached to a pivot 11. Thereby, door 9 may be moved to an open position (shown) where gas is allowed to enter outlet duct 7 and to a closed position (faintly outlined) where the door 9 seals opening 6. By sealing opening 6, the flow of gas 1 from the plenary space 5 to outlet duct 7 is substantially stopped. Door 9 is activated by means of an actuator 13 outside duct wall 15 of filter module 3 to position door 9 in a closed position to seal opening 6. Sealing opening 6 allows for example, service staff to safely enter the filter plenary space to conduct maintenance work.

As long as the fabric filter 3a area is relatively small and hence opening 6 is relatively small, the arrangement of FIG. 1 does provide an efficient gas flow regulating solution. When a bigger fabric filter 3a area is considered however, a greater gas flow is at hand and the size of opening 6/outlet duct 7 must be increased as well. Increasing the size of opening 6 then requires the use of a larger door 9 of considerable area, which requires great force to be actuated. This implies that doors 9 and their associated actuators 13 are expensive in larger fabric filter systems.

FIG. 2 illustrates a portion of a filter module including an outlet according to the present disclosure. This filter module 3 includes a flow control device in the form of a guillotine-type damper 17, positioned in outlet duct 7. Generally, a guillotine-type damper 17 comprises a blade 19 which is slideable, by means of an actuator 13, in and out of opening 6 to outlet duct 7, such that it can be moved between an open position, i.e., out of opening 6, where blade 19 does not influence gas flow 1, and a closed position, i.e., in and sealing opening 6, blocking gas flow 1. The guillotine-type damper 17 is described in more detail with reference to FIGS. 3 and 4 below.

It is possible to use also intermediate blade 19 positions between the closed position and the opened position to regulate gas flow. Positioning blade 19 in intermediate positions may be desirable, for example, to balance the flow of two or more parallel filters. Accordingly, actuator 13 is useful for positioning blade 19 at any desired position between and including the opened and closed positions.

A collar 21 may be provided, having a collar body 21a, one wide end 23 of a particular circumference and one narrow end 25 of a particular circumference smaller than that of wide end 23. Collar 21 may be used to fluidly connect outlet duct 7 to plenary space 5. The wide end 23 of collar 21 is positioned in plenary space 5 and the narrow end 25 is positioned in outlet duct 7. Collar 21 is so used to improve the gas flow 1 profile, such that a smaller circumference narrow end 25 may be used depending on the gas flow 1 pressure loss and velocity. With a smaller circumference narrow end 25, likewise requires a blade 19 of smaller dimensions. Collar 21 is described in more detail with reference to FIGS. 5 and 6 below.

Guillotine-type damper 17 is controlled by means of an actuator 13 positioned exterior to exterior surface 15a of wall 15. Wall 15 includes exterior surface 15a and interior surface 15b. Interior surface 15b defines a portion of plenary space 5 and outlet duct 7. A link 27 movably passes through wall 15 to connect actuator 13 with blade 19.

Figure 4:
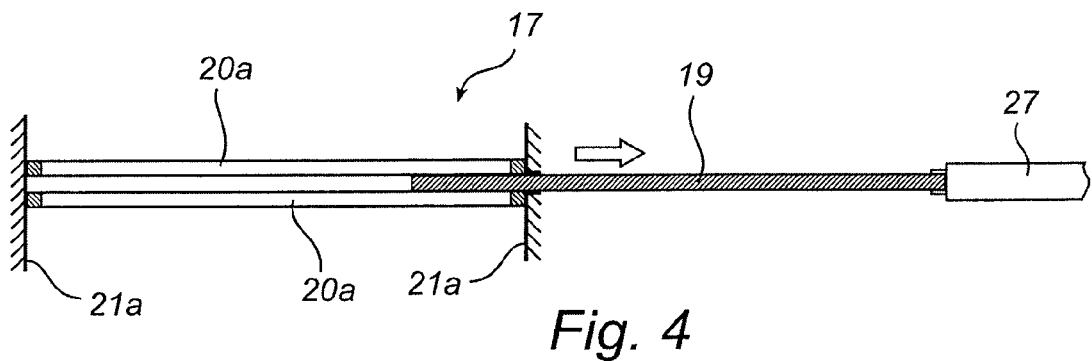
FIG. 4 shows a guillotine type damper in an open position.

FIG. 3 shows a guillotine-type damper 17 with blade 19 in a closed position. As illustrated in cross section, guillotine-type damper 17 has a blade 19 supported by a support frame 20. Support frame 20 is fixedly attached within collar body 21a. Blade 19 movably bisects a portion of collar body 21a for positioning within collar 21 between supports 20a of frame 20. In the closed position, illustrated in FIG. 3, supports 20a are suitable to support forces on blade 19 caused by an over pressure within plenary space 5. With this over pressure in plenary space 5, actuator 13, is with relatively little force suitable to slide a desired portion of blade 19 out from the bisected portion of collar body 21a and frame 20 into an opened position. With blade 19 in an opened position, (FIG. 4) gas flow 1 passes through collar 21. As mentioned previously, the blade 19 may be movably positioned in any number of positions between and including the fully opened position and sealed closed position in order to variably control gas flow 1 through collar 21. Blade 19 may be produced of any material suitable for the intended use such as for example but not limited to steel.

FIG. 5 illustrates in cross section one embodiment of collar 21. In this embodiment, collar body 21a defines a smoothly curved surface 44 between wide end 23 and narrow end 25. Such enables unimpeded channeling of gas flow 1 into outlet duct 7. Variations of collar body 21a curvatures or geometries are conceivable, e.g., a specific radius or a radius resembling approximately an exponential function, square, rectangle and the like. Preferred embodiments smooth gas flow 1 and reduce the pressure loss at narrow end 25 in outlet duct 7. Another embodiment of collar 21 is illustrated in cross section in FIG. 6. This embodiment of collar 21 is somewhat funnel-shaped to smooth gas flow 1 and reduce pressure loss at narrow end 25, at least to some extent.

FIG. 7 illustrates a front view of two wide ends 23 of collars 21. Collars 21 are square or rectangular, having four side portions 47, 49, 51, 53 comprising collar body 21a. Such provides a rectangular narrow end 25 where a guillotine-type damper 17 may readily be positioned as described in detail above.

In summary, the present disclosure relates to a fabric filter system, which may be used for removing particulate matter from a gas, such as a combustion process gas. The fabric filter system includes fabric filters in one or more filter modules. From the fabric filters, gas flows through a plenary space and an outlet duct. A flow control device controls the amount of gas passing from the plenary space into the outlet duct. The flow control device comprises a guillotine-type damper. The guillotine-type damper provides reliable and efficient control of the gas flow. A collar, connecting the plenary space with the outlet duct, improves gas flow into the outlet duct.

The scope of the present disclosure is not limited by the above-described examples and embodiments, but rather only by the appended claims. For instance, even if the above devices and methods have been described with regard to combustion processes, a fabric filter system as described may be used in other like processes as well.

The invention claimed is:

1. A fabric filter system, for removing particulate matter from a gas, comprising:
   a fabric filter;
   a filter plenary space, receiving gas from the fabric filter;
   an outlet duct, fluidly connected to the filter plenary space,
   a wall having interior and exterior surfaces, the interior surface defines a portion of the filter plenary space and the outlet duct;
   a flow control device for controlling the amount of gas passing from the plenary space into the outlet duct including a guillotine-type damper;
   a collar adapted to fluidically connect the outlet duct to the filter plenary space, the collar having a collar body; and
   an actuator configured to control the guillotine-type damper via a link, the actuator positioned exterior to the exterior surface of the wall,
   wherein the guillotine-type damper comprises a blade supported by a support frame fixedly attached within the collar body in such a manner that the blade movably bisects a portion of the collar body for positioning within the collar between supports of the support frame, and
   wherein the link movably passes through the wall to connect the actuator with the blade.

2. A fabric filter system according to claim 1, wherein the collar, having one wide end and one narrow end, arranged to fluidly connect the outlet duct to the filter plenary space, with the wide end positioned in the filter plenary space and the narrow end positioned in outlet duct.

3. A fabric filter system according to claim 1, wherein the collar body of the collar defines a smoothly curved surface for gas flow into outlet duct.

4. A fabric filter system according to claim 1, wherein the collar body of the collar is funnel-shaped.

5. A fabric filter system according to claim 1, wherein the collar body of the collar is rectangular in shape.

6. A fabric filter system according to claim 1, wherein the blade is movable between an open position and a closed position, and is further controllable to be used in at least one intermediate position between the open position and the closed position.

* * * * *